US011704618B2

(12) United States Patent
Jackson et al.

(10) Patent No.: US 11,704,618 B2
(45) Date of Patent: *Jul. 18, 2023

(54) APPLICATION MAPPING AND ALERTING BASED ON DATA DEPENDENCIES

(71) Applicant: Bank of America Corporation, Charlotte, NC (US)

(72) Inventors: Khalil Jackson, Charlotte, NC (US); Elizabeth Swanzy-Parker, Charlotte, NC (US); Edward L. Haletky, Austin, TX (US); Adam B. Richman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/465,944

(22) Filed: Sep. 3, 2021

(65) Prior Publication Data

US 2022/0067597 A1 Mar. 3, 2022

Related U.S. Application Data

(63) Continuation of application No. 17/010,600, filed on Sep. 2, 2020, now Pat. No. 11,144,862.

(51) Int. Cl.
*G06Q 10/067* (2023.01)
*H04L 47/78* (2022.01)
(Continued)

(52) U.S. Cl.
CPC ......... *G06Q 10/067* (2013.01); *H04L 47/762* (2013.01); *H04L 47/781* (2013.01);
(Continued)

(58) Field of Classification Search
CPC ..... G06Q 10/067; H04L 65/65; H04L 47/762; H04L 47/781; H04L 47/822; H04L 65/80
See application file for complete search history.

(56) References Cited

U.S. PATENT DOCUMENTS 7,168,045 B2   1/2007   Fliess et al.
8,150,783 B2   4/2012   Gonsalves et al.
(Continued)

*Primary Examiner* — Phyllis A Book
*Assistant Examiner* — Jihad K Boustany
(74) *Attorney, Agent, or Firm* — Banner & Witcoff, Ltd.

(57) ABSTRACT

Aspects of the disclosure relate to application mapping and alerting based on data dependencies in business and technology logic. In some embodiments, a computing platform may receive a request to map enterprise technology resources. Then, the computing platform may generate a business capability model. Next, the computing platform may cause a user computing device to display a graphical user interface comprising selectable graphical representations of applications associated with the enterprise technology resources. Then, the computing platform may receive a user input identifying an occurrence of a technology incident by selecting one of the graphical representations. In response to the selection, the computing platform may trace, using the generated business capability model, upstream or downstream impacts of the technology incident. Then, the computing platform may cause a visual representation of data dependencies indicating upstream or downstream impacts of the technology incident to be displayed on the user computing device.

18 Claims, 13 Drawing Sheets

(51) Int. Cl.
*H04L 65/80* (2022.01)
*H04L 47/762* (2022.01)
*H04L 47/70* (2022.01)
*H04L 65/65* (2022.01)

(52) U.S. Cl.
CPC ............ *H04L 47/822* (2013.01); *H04L 65/65* (2022.05); *H04L 65/80* (2013.01)

(56) References Cited

U.S. PATENT DOCUMENTS

| | | | |
|---|---|---|---|
| 8,712,596 B2 | 4/2014 | Scott | |
| 8,856,936 B2 | 10/2014 | Datta Ray et al. | |
| 8,914,878 B2 | 12/2014 | Burns et al. | |
| 9,008,617 B2 | 4/2015 | McConnell | |
| 9,306,965 B1 | 4/2016 | Grossman et al. | |
| 9,537,720 B1* | 1/2017 | Baggott | G06F 9/45558 |
| 9,628,501 B2 | 4/2017 | Datta Ray et al. | |
| 9,697,352 B1 | 7/2017 | Armstrong | |
| 9,749,343 B2 | 8/2017 | Watters et al. | |
| 9,888,024 B2 | 2/2018 | Roundy et al. | |
| 10,027,711 B2 | 7/2018 | Gill et al. | |
| 10,038,708 B2 | 7/2018 | Pearcy et al. | |
| 10,210,470 B2 | 2/2019 | Datta Ray | |
| 10,305,922 B2 | 5/2019 | Devi Reddy et al. | |
| 10,387,657 B2 | 8/2019 | Belfiore, Jr. et al. | |
| 11,023,511 B1* | 6/2021 | Fletcher | G06F 16/338 |
| 11,144,862 B1* | 10/2021 | Jackson | H04L 47/781 |
| 11,343,355 B1* | 5/2022 | Goela | H04L 41/12 |
| 2006/0230071 A1* | 10/2006 | Kass | G06Q 10/00 |
| 2008/0126858 A1* | 5/2008 | Barras | G06F 11/327 |
| | | | 714/25 |
| 2010/0306010 A1* | 12/2010 | Winther | G06Q 10/06 |
| | | | 715/764 |
| 2013/0304530 A1* | 11/2013 | Chodavarapu | G06Q 10/067 |
| | | | 705/7.11 |
| 2015/0242619 A1 | 8/2015 | Bender et al. | |
| 2016/0148223 A1* | 5/2016 | Saini | G06Q 10/067 |
| | | | 705/7.31 |
| 2017/0078175 A1* | 3/2017 | Xu | H04L 45/26 |
| 2017/0316203 A1 | 11/2017 | Reybok et al. | |
| 2018/0146004 A1 | 5/2018 | Belfiore, Jr. et al. | |
| 2018/0203795 A1* | 7/2018 | Gadiya | G06F 11/323 |
| 2018/0255077 A1 | 9/2018 | Paine | |
| 2019/0173909 A1 | 6/2019 | Mixer et al. | |
| 2021/0352099 A1* | 11/2021 | Rogers | G06F 16/252 |

\* cited by examiner

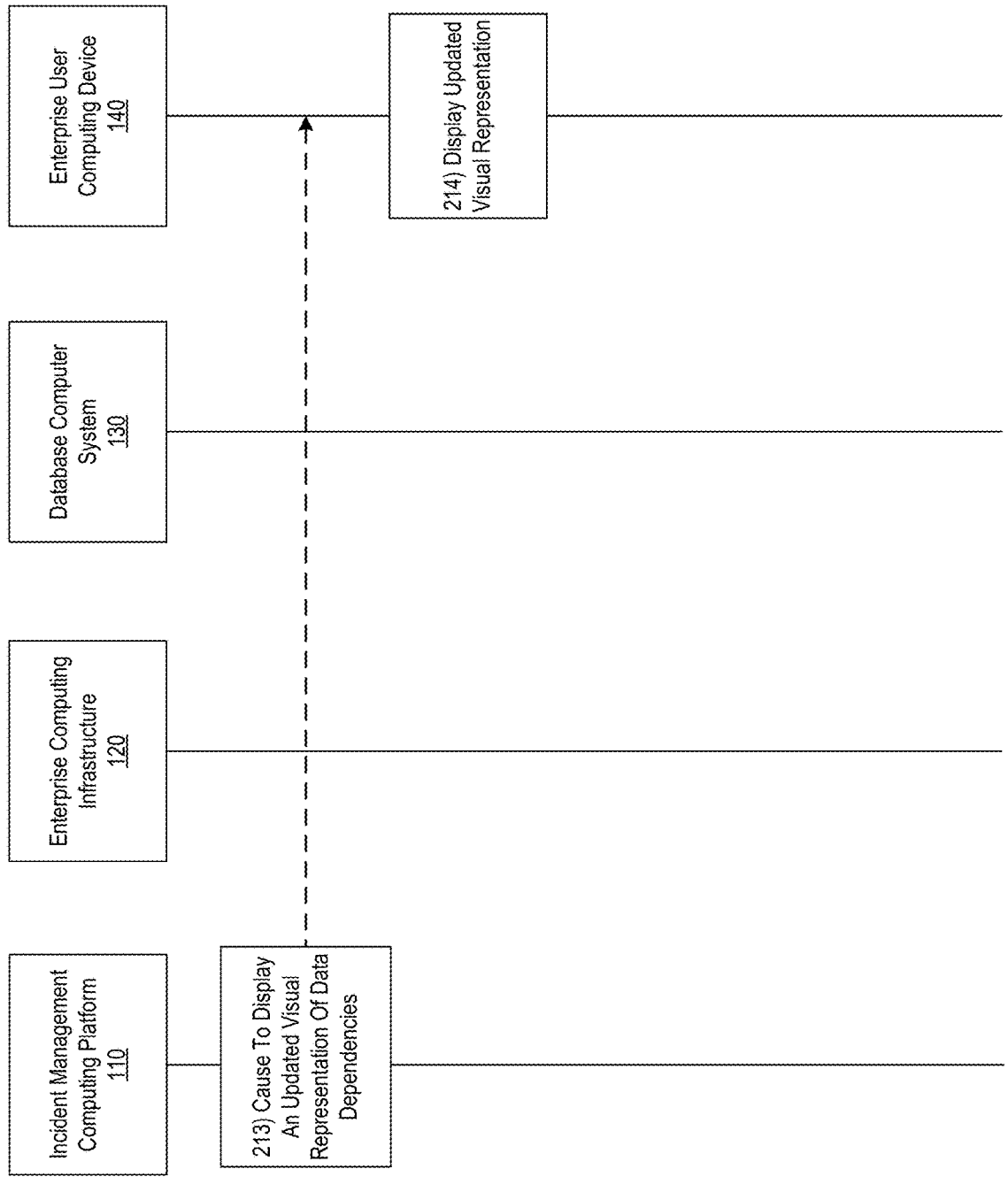

`US 11,704,618 B2`

APPLICATION MAPPING AND ALERTING BASED ON DATA DEPENDENCIES

CROSS-REFERENCE TO RELATED APPLICATIONS

The present application is a continuation of co-pending U.S. application Ser. No. 17/010,600, entitled "Application Mapping and Alerting Based on Data Dependencies," filed Sep. 2, 2020, the contents of which are hereby incorporated by reference in its entirety for all purposes.

BACKGROUND

Aspects of the disclosure of the disclosure relate to preventing unauthorized access to computer systems and ensuring information security. In particular, one or more aspects of the disclosure relate to application mapping and alerting based on data dependencies in business and technology logic.

Organizations are facing increasing risks and threats from various causes. Moreover, information security incidents are often complex activities that can involve multiple applications, systems, and technology components, for example. Current attempts to identify and eliminate these risks or threats are ineffective and/or are difficult to understand and implement. In many instances, it may be difficult to understand data lineage (e.g., where the data came from, where the data is going) and data transformation (e.g., how the data has changed along the way), particularly when attempting to do so simultaneously from technical and business perspectives. In addition, in many instances, understanding the size, scope, and complexity of an incident becomes more challenging as data traverses multiple applications and systems.

SUMMARY

Aspects of the disclosure provide effective, efficient, scalable, and convenient technical solutions that address and overcome the technical problems associated with preventing unauthorized access to computer systems and ensuring information security. In particular, one or more aspects of the disclosure provide techniques for application mapping and alerting based on data dependencies in business and technology logic (e.g., in business logic and supporting underlying technologies).

In accordance with one or more embodiments, a computing platform having at least one processor, a communication interface, and memory may receive, via the communication interface, a request to map one or more enterprise technology resources. In response to receiving the request to map one or more enterprise technology resources, the computing platform may generate a business capability model. In addition, in generating the business capability model, the computing platform may discover network computer resources, interrogate the network computer resources to identify relationships between the network computer resources and upstream or downstream data flows associated with one or more business processes, and based on identifying the relationships between the network computer resources and the upstream or downstream data flows associated with the one or more business processes, store data records linking the network computer resources to particular ones of the data flows and associated business processes. Subsequently, the computing platform may cause a graphical user interface, which may include one or more selectable graphical representations of one or more applications associated with one or more enterprise technology resources, to be displayed on a display device of a user computing device. Thereafter, the computing platform may receive, via the communication interface, a first user input identifying an occurrence of a technology incident by selecting one of the graphical representations of the one or more applications. In response to receiving the first user input, the computing platform may trace, using the business capability model, upstream or downstream impacts of the technology incident. Then, the computing platform may cause a visual representation of data dependencies indicating upstream or downstream impacts of the technology incident to be displayed on the display device of the user computing device.

In some embodiments, tracing the upstream or downstream impacts of the technology incident may include tracing the upstream or downstream impacts at N levels, where N is greater than two.

In some embodiments, the computing platform may dynamically update the visual representation of data dependencies as new technology incidents are identified.

In some embodiments, causing the visual representation of data dependencies indicating the upstream or downstream impacts of the technology incident to be displayed on the display device of the user computing device may include causing the user computing device to illuminate, on the display device of the user computing device, graphical representations of applications associated with enterprise technology resources in upstream or downstream dependencies.

In some embodiments, the computing platform may validate accuracy of enterprise data based on tracing the upstream or downstream impacts of the technology incident.

In some embodiments, the computing platform may: receive a second user input that simulates a removal of one or more applications by interacting with one or more selectable graphical representations of the one or more applications; in response to receiving the second user input, trace, using the business capability model, upstream or downstream impacts of removing the of one or more applications; and cause a visual representation of data dependencies indicating upstream or downstream impacts of the removal of the one or more applications to be displayed on the display device of the user computing device.

In some embodiments, the computing platform may: receive a third user input simulating an addition of one or applications by interacting with the graphical user interface; in response to receiving the third user input, trace, using the business capability model, upstream or downstream impacts of adding the one or more applications; and cause a visual representation of data dependencies indicating upstream or downstream impacts of the addition of the one or more applications to be displayed on the display device of the user computing device.

In some embodiments, the computing platform may continuously update the business capability model in accordance with new laws or regulations.

In some embodiments, the computing platform may continuously update the business capability model as network computer resources are removed or new network computer resources are added.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for application mapping and alerting in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
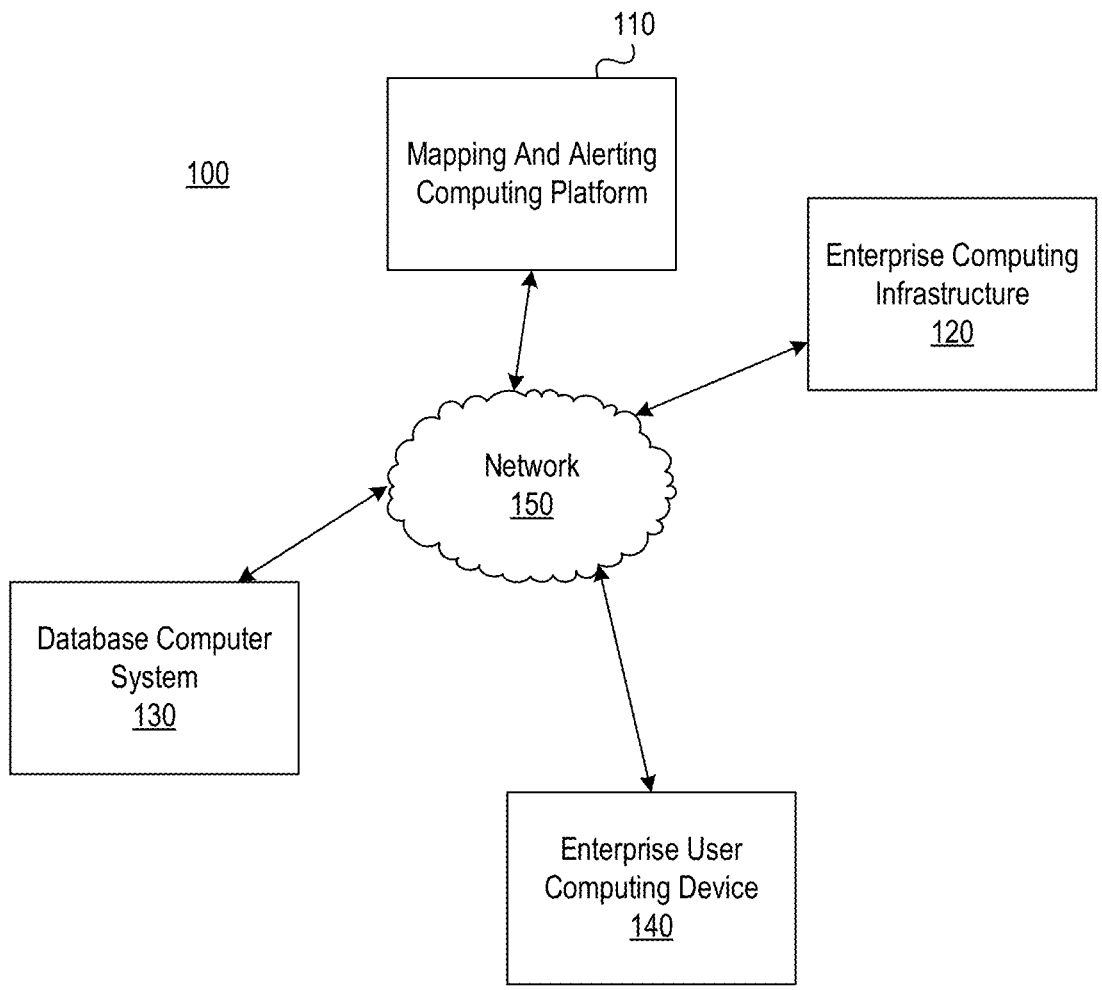
FIGS. 1A and 1B depict an illustrative computing environment for application mapping and alerting in accordance with one or more example embodiments.
Figure 1B:
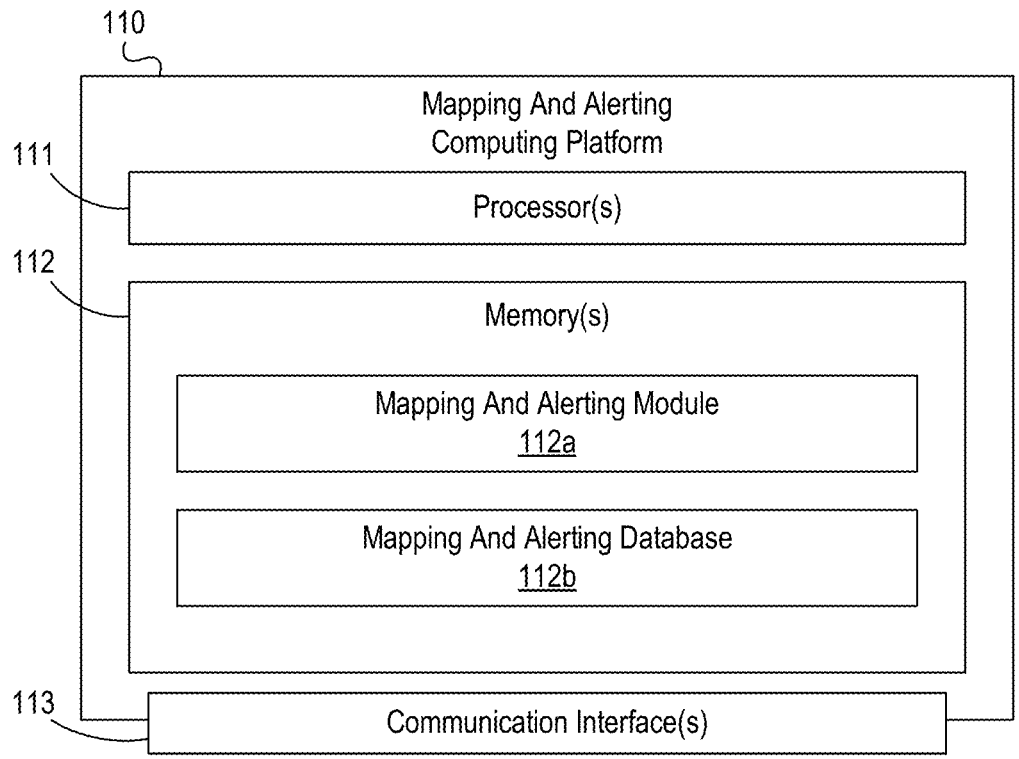

FIGS. 1A and 1B depict an illustrative computing environment for application mapping and alerting based on data dependencies in business and technology logic in accordance with one or more example embodiments. Referring to FIG. 1A, computing environment 100 may include one or more computing devices and/or other computing systems. For example, computing environment 100 may include mapping and alerting computing platform 110, enterprise computing infrastructure 120, database computer system 130, and enterprise user computing device 140. Although one enterprise user computing device 140 is shown for illustrative purposes, any number of enterprise user computing devices may be used without departing from the disclosure.

As illustrated in greater detail below, mapping and alerting computing platform 110 may include one or more computing devices configured to perform one or more of the functions described herein. For example, mapping and alerting computing platform 110 may include one or more computers (e.g., laptop computers, desktop computers, servers, server blades, or the like).

Enterprise computing infrastructure 120 may include backend servers and systems. For example, the backend systems may include one or more computers or other computing devices such as one or more server systems, one or more processing devices such as one or more server blades, and one or more memory devices as well as one or more communication devices. The backend servers and systems may be mapped and/or linked to different business processes, as discussed in greater detail below.

Database computer system 130 may include different information storage entities storing one or more business capability models. For instance, a business capability model may include an integrated and comprehensive set of business capabilities that describe what an organization can do. The business capability model may be structured in a hierarchical manner, having several levels of depth and granularity. Database computer system 130 may also include a system of records (SOR). For example, database computer system 130 may include an application inventory tool (AIT) storing data about one or more applications that may be associated with a line of business or multiple lines of business.

Enterprise user computing device 140 may include one or more computing devices and/or other computer components (e.g., processors, memories, communication interfaces). For instance, enterprise user computing device 140 may be a server, desktop computer, laptop computer, tablet, mobile device, or the like, and may be associated with an enterprise organization operating mapping and alerting computing platform 110.

Computing environment 100 also may include one or more networks, which may interconnect one or more of mapping and alerting computing platform 110, enterprise computing infrastructure 120, database computer system 130, and enterprise user computing device 140. For example, computing environment 100 may include network 150. Network 150 may include one or more sub-networks (e.g., local area networks (LANs), wide area networks (WANs), or the like). For example, network 150 may include a private sub-network that may be associated with a particular organization (e.g., a corporation, financial institution, educational institution, governmental institution, or the like) and that may interconnect one or more computing devices associated with the organization. For example, mapping and alerting computing platform 110, enterprise computing infrastructure 120, database computer system 130, and enterprise user computing device 140 may be associated with an organization, and a private sub-network included in network 150 and associated with and/or operated by the organization may include one or more networks (e.g., LANs, WANs, virtual private networks (VPNs), or the like) that interconnect mapping and alerting computing platform 110, enterprise computing infrastructure 120, database computer system 130, and enterprise user computing device 140. Network 150 also may include a public sub-network that may connect the private sub-network and/or one or more computing devices connected thereto (e.g., mapping and alerting computing platform 110, enterprise computing infrastructure 120, database computer system 130, and enterprise user computing device 140) with one or more networks and/or computing devices that are not associated with the organization.

In one or more arrangements, mapping and alerting computing platform 110, enterprise computing infrastructure 120, database computer system 130, and enterprise user computing device 140 may be any type of computing device capable of receiving a user interface, receiving input via the user interface, and communicating the received input to one or more other computing devices. For example, mapping and alerting computing platform 110, enterprise computing infrastructure 120, database computer system 130, enterprise user computing device 140, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, mapping and alerting computing platform 110 may include one or more processor(s) 111, memory(s) 112, and communication interface(s) 113. A data bus may interconnect processor 111, memory 112, and communication interface 113. Communication interface 113 may be a network interface configured to support communication between mapping and alerting computing platform 110 and one or more networks (e.g., network 150 or the like). Memory 112 may include one or more program modules having instructions that when executed by processor 111 cause mapping and alerting computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of mapping and alerting computing platform 110 and/or by different computing devices that may form and/or otherwise make up mapping and alerting computing platform 110. For example, memory 112 may have, store, and/or include a mapping and alerting module 112a and a mapping and alerting database 112b. Mapping and alerting module 112a may have instructions that direct and/or cause mapping and alerting computing platform 110 to, for instance, provide a graphical user interface that includes one or more views of end-to-end data flow dependencies including both business data lineage and technical lineage details, leveraging the full value of enterprise data and/or instructions that direct mapping and alerting computing platform 110 to perform other functions, as discussed in greater detail below. Mapping and alerting database 112b may store information used by mapping and alerting module 112a and/or mapping and alerting computing platform 110 in performing application mapping and alerting based on data dependencies in business and underlying technology logic and/or in performing other functions, as discussed in greater detail below.

Figure 2A:
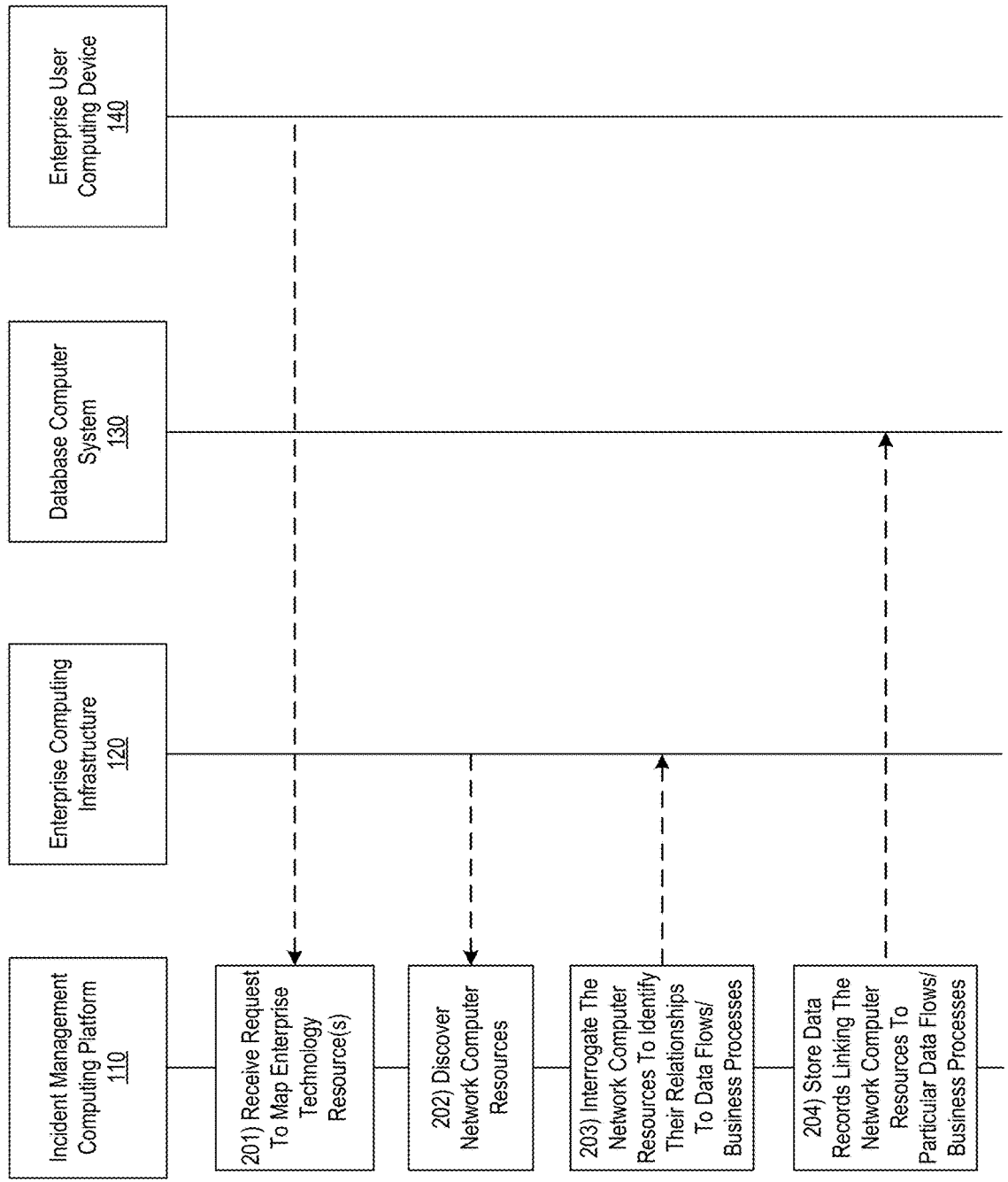

FIGS. 2A-2D depict an illustrative event sequence for application mapping and alerting in accordance with one or more example embodiments. Referring to FIG. 2A, at step 201, mapping and alerting computing platform 110 may receive, via the communication interface (e.g., communication interface 113), a request to map one or more enterprise technology resources (e.g., resources associated with global banking and markets technology, risk and finance technology, and the like).

Thereafter, at steps 202 through 204, in response to receiving the request to map one or more enterprise technology resources, mapping and alerting computing platform 110 may generate a business capability model. Specifically, in generating the business capability model, mapping and alerting computing platform 110 may, at step 202, discover network computer resources (e.g., servers, applications, services, and the like). For example, mapping and alerting computing platform 110 may generate and send interrogation requests to other systems in a network, receive responses to the interrogation requests, identify systems, and add the identified systems to a catalog.

Further, in generating the business capability model, mapping and alerting computing platform 110 may, at step 203, interrogate the network computer resources to identify relationships between the network computer resources and upstream or downstream data flows associated with one or more business processes. For example, mapping and alerting computing platform 110 may generate and send interrogation requests to resources to identify which data flows the resources interact with, receive responses to the interrogation requests, and store records based on the responses. The one or more business processes may include business functions/services such as a line-of-business (LOB) or an enterprise control function (ECF). An upstream data flow may include the flow of data (e.g., code) toward an original source, and a downstream data flow may include the flow of data away from the original source. Such lineage details may identify where sensitive or business-critical data elements reside and how they have changed over time, who has access to it and how it is shared.

Further, in generating the business capability model, mapping and alerting computing platform 110 may, at step 204, store data records linking the network computer resources to particular ones of the data flows and associated business processes based on the identified relationships (e.g., at step 203) between the network computer resources and the upstream or downstream data flows associated with the one or more business processes. The generated business capability model may be stored in, for example, database computer system 130.

In some embodiments, the business capability model may be continuously updated in accordance with new laws or regulations. For example, new laws or regulations, either internal or external to the organization, may impact current risk levels and current technology, applications, systems, business processes, and/or the like. For example, based on receiving information identifying new laws or regulation, mapping and alerting computing platform 110 may generate, store, and/or manage updated processing rules and/or updated model parameters associated with the new laws or regulations.

In some embodiments, the business capability model may be continuously updated as network computer resources are removed or new network computer resources are added. For example, as new processes, systems, or data sources are added to or removed from the business capability or information technology landscape, mapping and alerting computing platform 110 may continuously modify, update, or extend the business and technology mappings/connections (e.g., create a new top level capability, change the hierarchy of a capability, add a child capability to a parent capability, delete a capability, and/or the like). For example, based on receiving a user input action, mapping and alerting computing platform 110 may generate, store, and/or manage updated business capability attributes, updated relationships between business capabilities, and/or updated model parameters associated with the user input action.

Figure 2B:
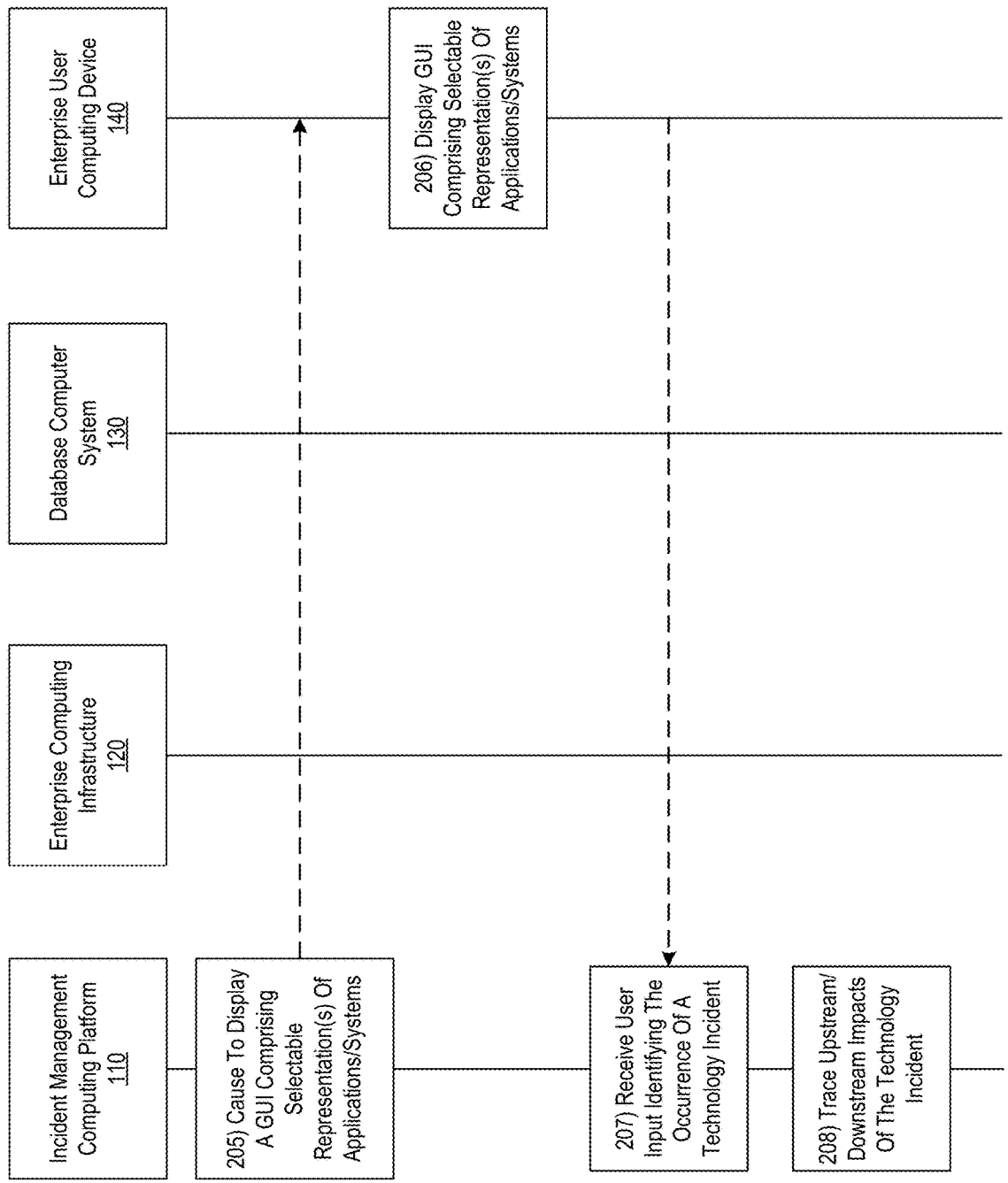

Referring to FIG. 2B, at step 205, mapping and alerting computing platform 110 may generate and/or cause a user computing device to display, on a display device of the user computing device, a graphical user interface (GUI) which may include one or more selectable graphical representations of one or more applications or systems associated with one or more enterprise technology resources. For example, at step 206, mapping and alerting computing platform 110 may cause enterprise user computing device 140 to display a plurality of applications on its screen available for selection that are associated with various enterprise technology resources. In some embodiments, the GUI may or may not include an application programming interface (API) such that the selection of one or more applications or systems associated with one or more enterprise technology resources may be implemented through the API.

Figure 3:
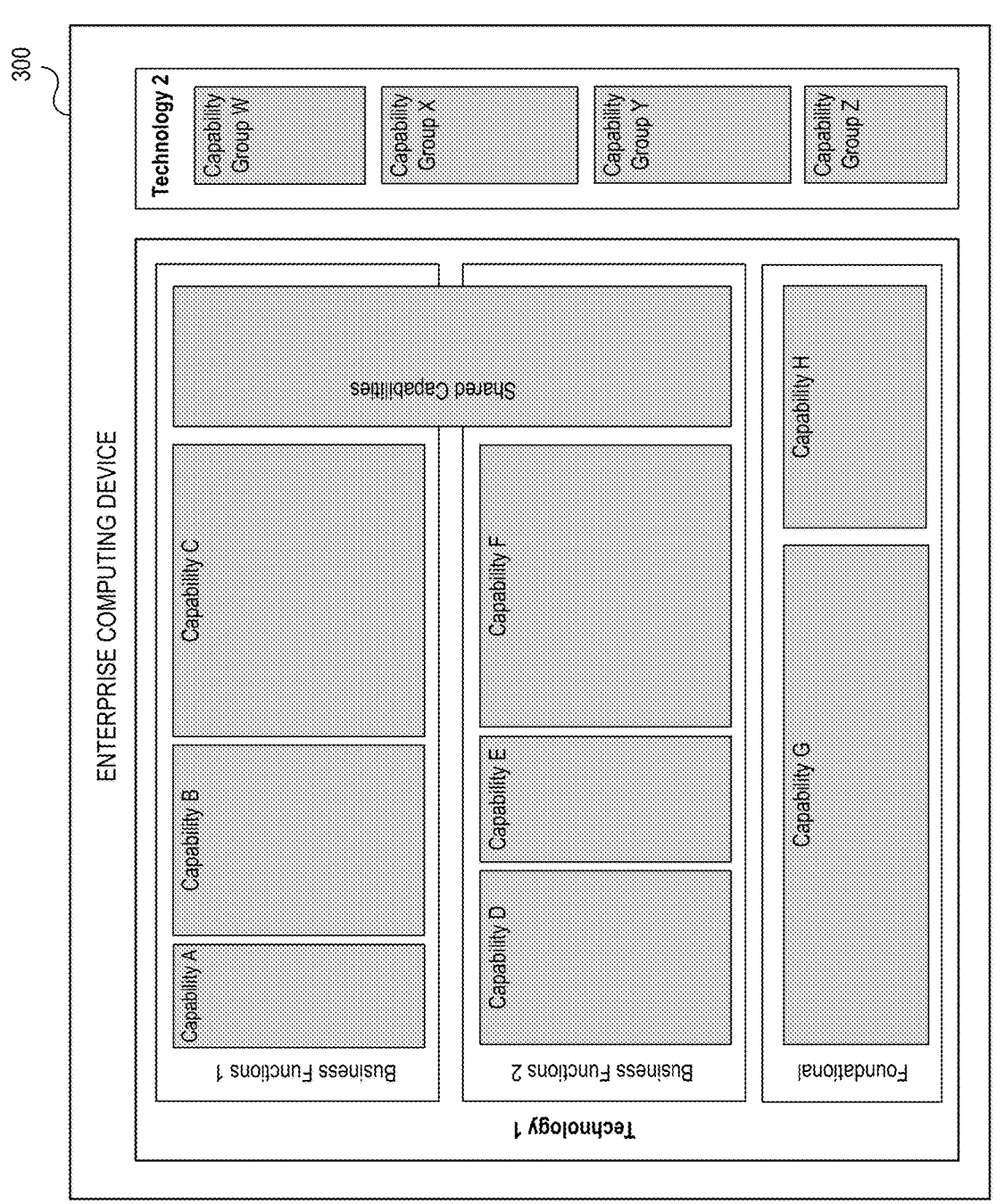
FIGS. 3-8 depict example graphical user interfaces for application mapping and alerting in accordance with one or more example embodiments.
Figure 4:
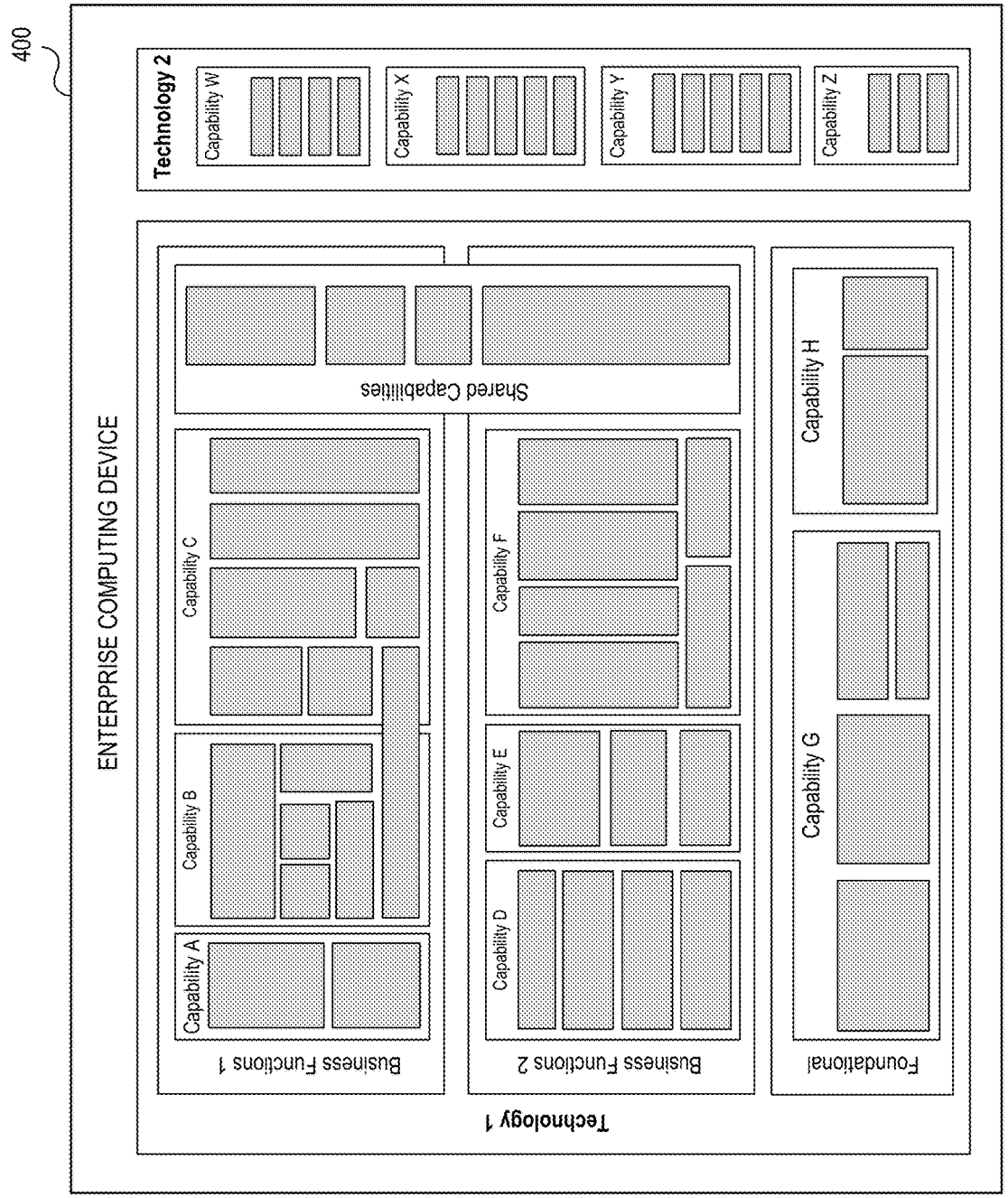
Figure 5:
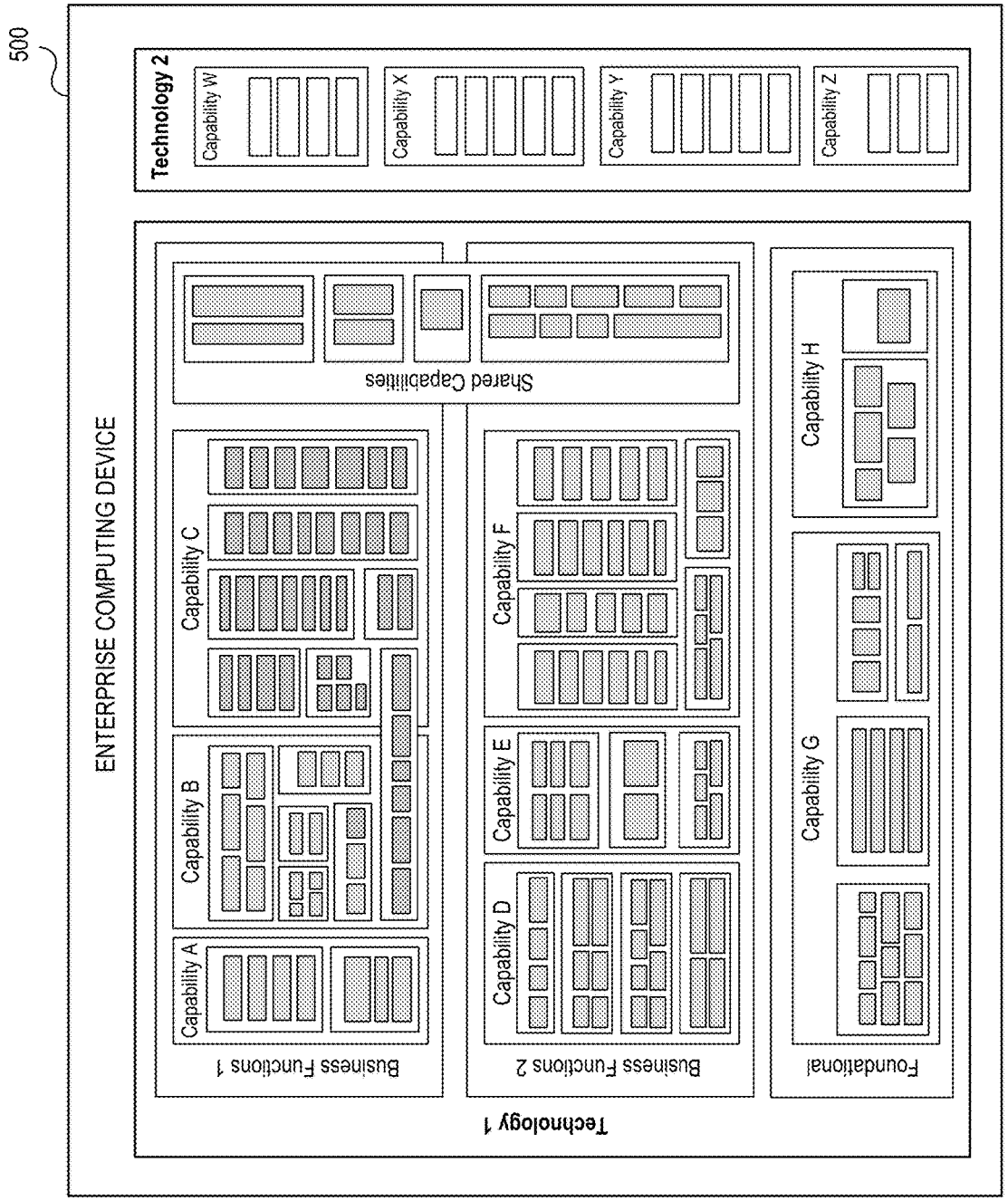

For example, at step 206, enterprise user computing device 140 may be caused to display and/or otherwise present one or more graphical user interfaces (GUIs) similar to GUIs 300, 400, or 500, which are illustrated in FIGS. 3 through 5, respectively. As seen in FIGS. 3-5, GUIS 300, 400, and 500 may include graphical objects, text and/or other information displaying business capability models organized into multiple levels of capability data, each cell representing a business capability associated with underlying applications and/or systems, and each higher-level business capability including multiple constituting lower-level capabilities. As indicated by the cells highlighted in gray in each of GUIs 300, 400, and 500, the business capabilities may, for instance, be defined at different levels starting from an aggregate or top level (e.g., Level "0" as shown in GUI 300), to a first sub-level (e.g., Level "1" as shown in GUI 400), a second sub-level (e.g., Level "2" as shown in GUI 500), up to "N" levels (e.g., Level "N"), where N is greater than two. In some embodiments, each level may be linked to a preceding or following (e.g., adjacent) level or sequence of levels. For example, business areas within an organization may be classified as Level "0", business function integrations within the business areas may be classified as Level "1", and horizontal execution of the business functions may be classified as Level "2".

In some embodiments, the levels may identify a level of risk, urgency, or impact of an event, situation, or condition to a business, clients, and/or the like. For example, an incident involving a Level "0" capability may have a higher impact on an organization (e.g., presenting a greater risk) than an incident involving a Level "1" capability, and therefore may be given higher priority or importance by mapping and alerting computing platform 110 during incident handling. Similarly, an incident involving a Level "1" capability may have a higher impact on an organization (e.g., presenting a greater risk) than an incident involving a Level "2" capability, and therefore may be given higher priority or importance during incident handling.

Returning to FIG. 2B, at step 207, mapping and alerting computing platform 110 may receive, via the communication interface (e.g., communication interface 113), a first user input identifying an occurrence of a technology incident or issue. The user input may, for instance, be received by mapping and alerting computing platform 110 as a selection of one of the graphical representations of the one or more applications or systems. Such received user input may, for example, be received from and/or initiated by a user of enterprise user computing device 140 interacting with a graphical user interface displayed thereon and selecting one of the graphical representations of one or more applications or systems. The identification of the occurrence of the technology incident or issue may indicate, for example, the occurrence of a technology fault or cyber attack impacting an enterprise's ability to conduct business or a technology outage resulting in a problem, inconvenience, or service level deficiency for an enterprise customer.

At step 208, in response to receiving the first user input, mapping and alerting computing platform 110 may trace, using the business capability model (e.g., generated at steps 202 through 204), upstream or downstream impacts of the technology incident. In addition, at step 208, tracing the upstream or downstream impacts of the technology incident may include tracing the upstream or downstream impacts at N levels, where N is greater than two. For example, in tracing the upstream or downstream impacts of the technology incident, mapping and alerting computing platform 110 may identify connections between linked elements and generate a path across the linked elements to identify affected systems, resources, and/or the like.

In some embodiments, based on tracing the upstream or downstream impacts of the technology incident, mapping and alerting computing platform 110 may validate the accuracy, consistency, and reliability of enterprise data. For example, in validating the enterprise data, mapping and alerting computing platform 110 may determine that there are no broken links in the chain of linked elements (e.g., affected systems, resources, and/or the like). For instance, by being able to trace data and detect data lineage or data processing across various applications and systems, the accuracy of systems of records may be improved.

Figure 2C:
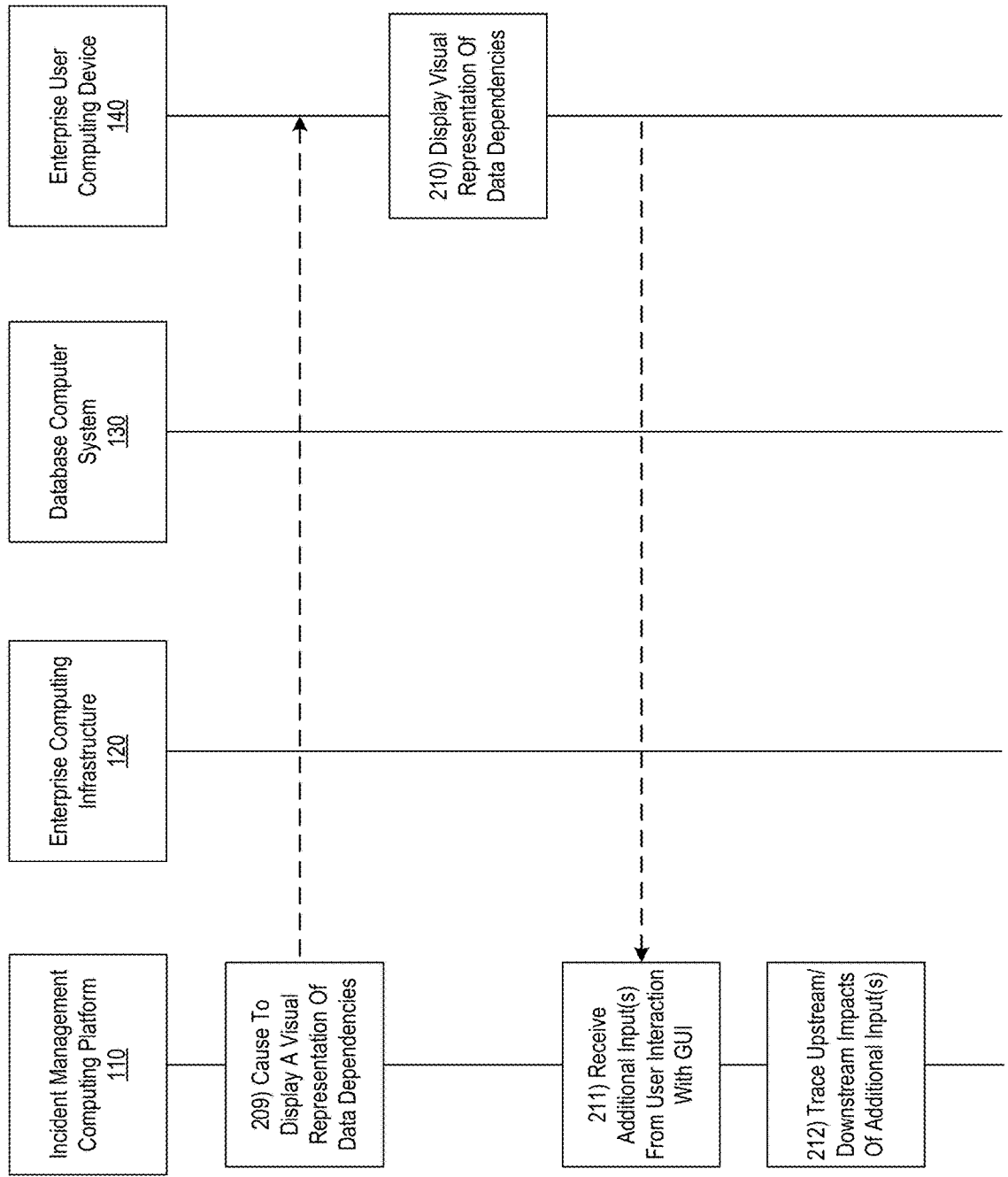

Referring to FIG. 2C, at step 209, mapping and alerting computing platform 110 may cause a visual representation of data dependencies indicating upstream or downstream impacts of the technology incident to be displayed on the display device of the user computing device.

Figure 6:
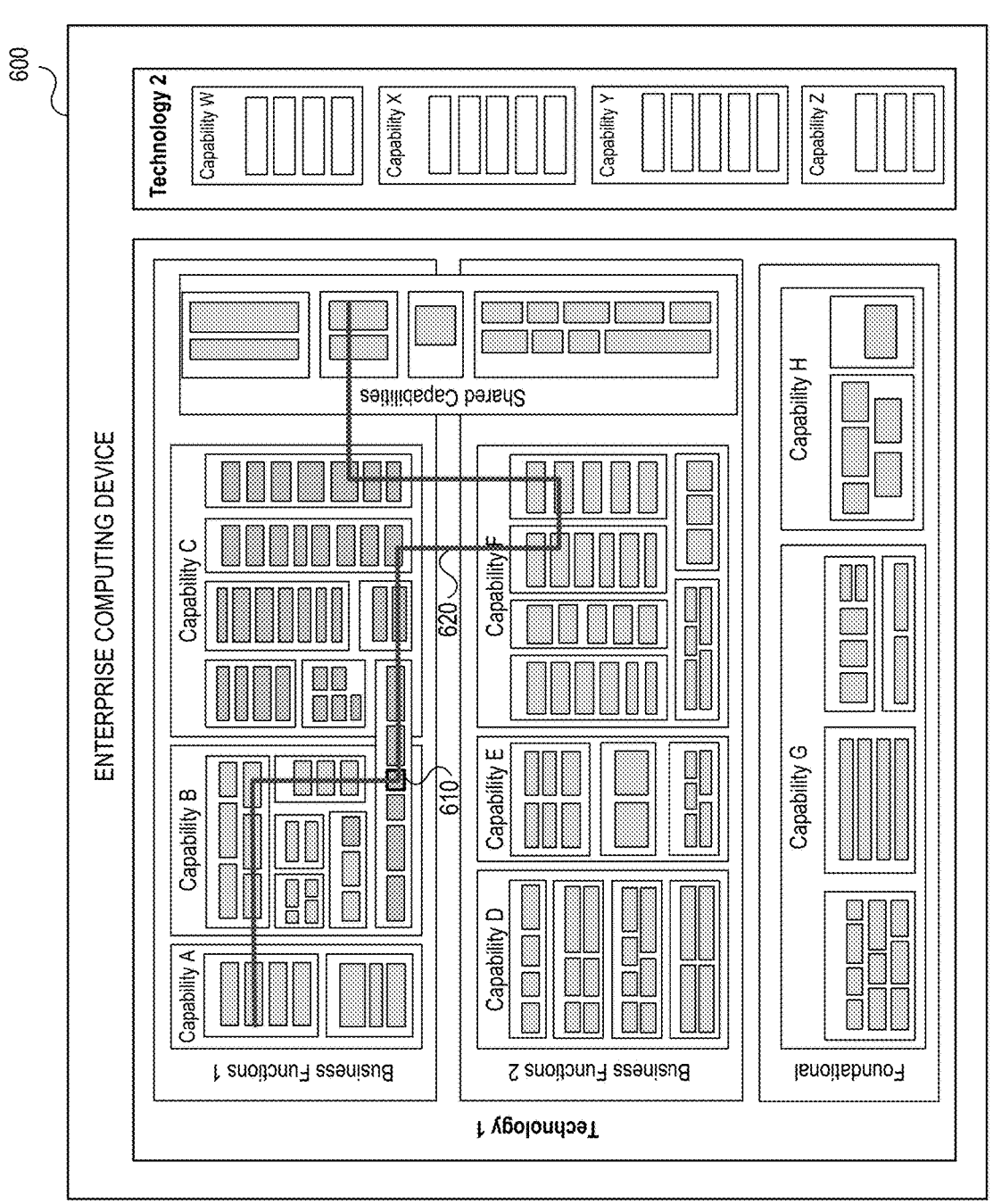

In some embodiments, causing the visual representation of data dependencies indicating the upstream or downstream impacts of the technology incident to be displayed on the display device of the user computing device may include causing the user computing device to illuminate, on the display device of the user computing device, graphical representations of applications associated with enterprise technology resources in upstream or downstream dependencies. For example, at step 210, enterprise user computing device 140 may be caused to display and/or otherwise present one or more graphical user interfaces similar to graphical user interface 600, which is illustrated in FIG. 6. As seen in FIG. 6, graphical user interface 600 may include graphical objects, text and/or other information presenting a path 630 indicating upstream and/or downstream impacts of the technology incident associated with a selected graphical representation (e.g., object 610). Such a graphical user interface 600 may include an interactive mapping of data dependencies that would illuminate or otherwise reveal themselves in a visually representative manner showing all upstreams and downstreams for a particular application (e.g., at path 630).

Returning to FIG. 2C, at step 211, in some embodiments, mapping and alerting computing platform 110 may receive additional input(s) from a user of enterprise user computing device 140 interacting with the graphical user interface. For example, mapping and alerting computing platform 110 may receive a second user input that simulates a removal of one or more applications by interacting with (e.g., selecting) one or more selectable graphical representations of the one or more applications, a third user input simulating an addition of one or applications by interacting with the graphical user interface (e.g., inserting a graphical representation of one or more applications), and/or other like user inputs.

In response to receiving the additional user input, mapping and alerting computing platform 110 may, at step 212, trace, using the business capability model, upstream or downstream impacts of the user input action received at step 211.

In turn, referring to FIG. 2D, at step 213, mapping and alerting computing platform 110 may cause an updated visual representation of data dependencies to be displayed on the display device of the user computing device. For instance, at step 213, mapping and alerting computing platform 110 may dynamically update the visual representation of data dependencies as new technology incidents are identified or as applications and/or systems are removed or added to the business capability or information technology landscape.

Figure 7:
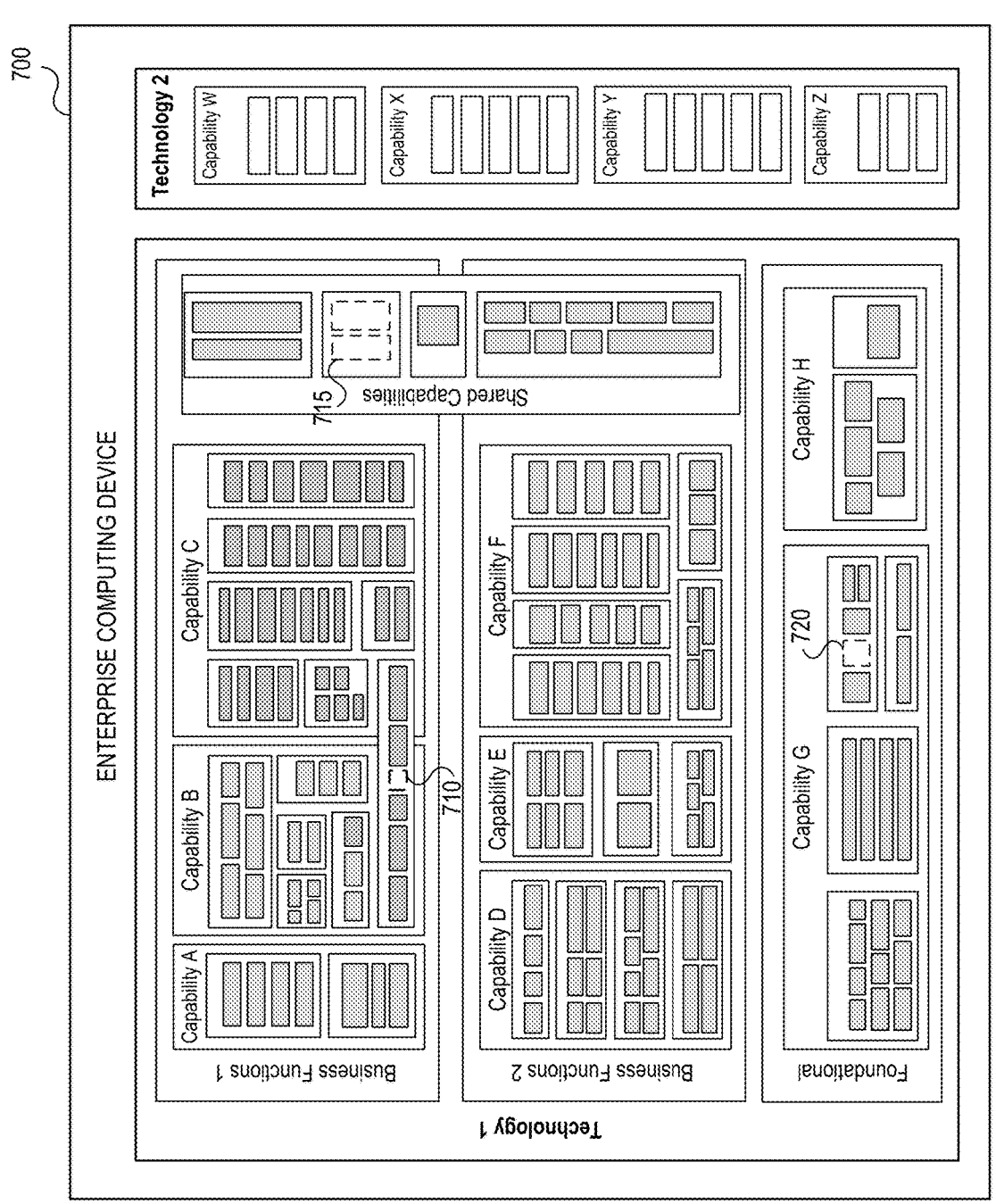

For instance, at step 214, mapping and alerting computing platform 110 may cause enterprise user computing device 140 to display and/or otherwise present one or more graphical user interfaces similar to graphical user interface 700, which is illustrated in FIG. 7. As seen in FIG. 7, graphical user interface 700 may include graphical objects, text and/or other information indicating upstream or downstream impacts of the removal of one or more applications or systems. For example, as illustrated in broken lines, when an application associated with object 710 is retired, applications associated with objects 715 and 720 may be illustrated as being impacted applications.

Figure 8:
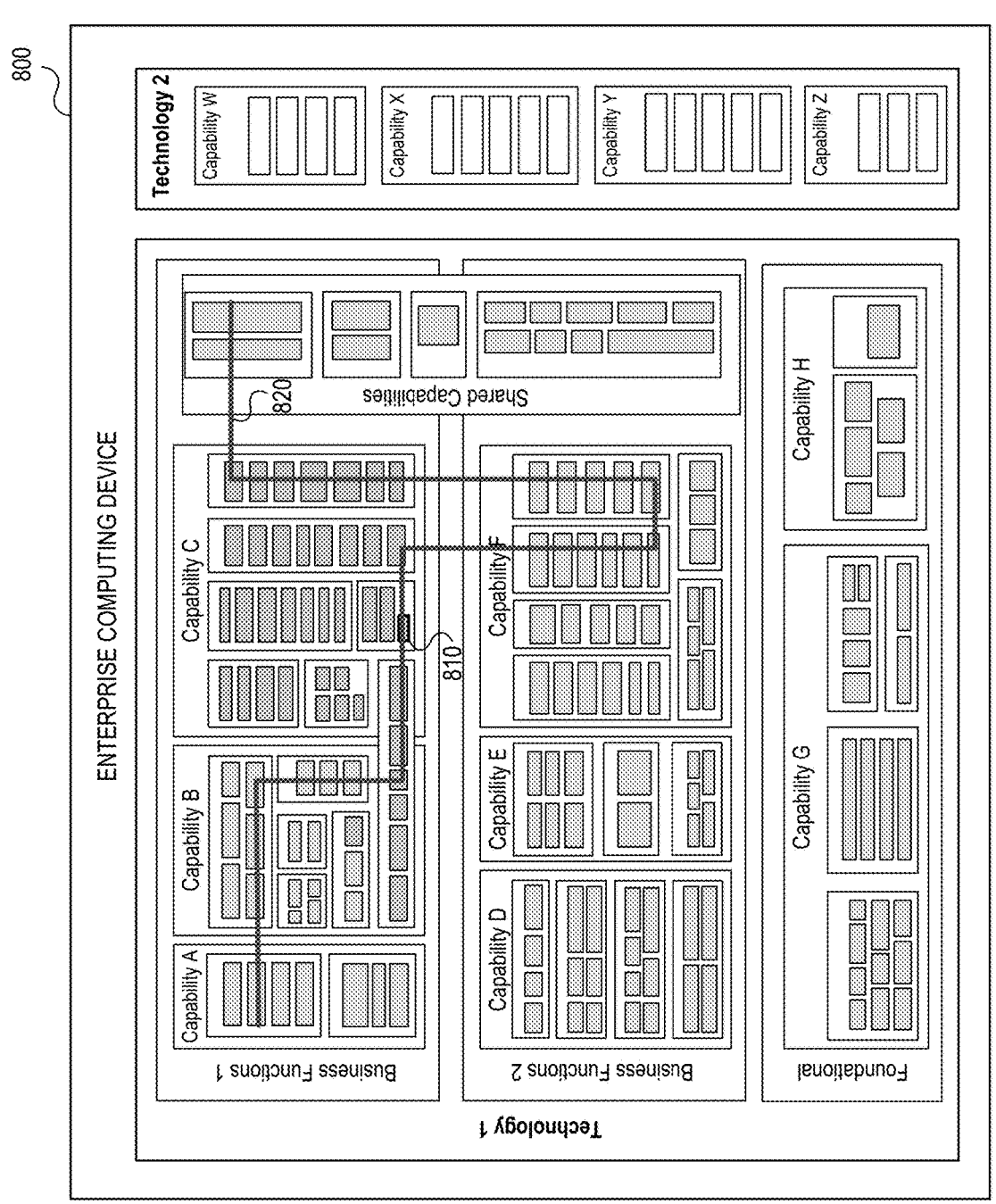

Additionally or alternatively, at step 214, mapping and alerting computing platform 110 may cause enterprise user computing device 140 to display and/or otherwise present one or more graphical user interfaces similar to graphical user interface 800, which is illustrated in FIG. 8. As seen in FIG. 8, graphical user interface 800 may include graphical objects, text and/or other information indicating upstream or downstream impacts of the addition of one or more applications or systems. For example, when an application associated with object 810 is added, applications along path 820 may be illustrated by mapping and alerting computing platform 110 as being impacted applications. For instance, mapping and alerting computing platform 110 may cause path 820 to be illuminated or otherwise be revealed when the application associated with object 810 is added, showing all upstreams and downstreams for the particular application.

Accordingly, users may efficiently examine and determine upstream and downstream effects of any changes to the business capability or information technology landscape.

Figure 9:
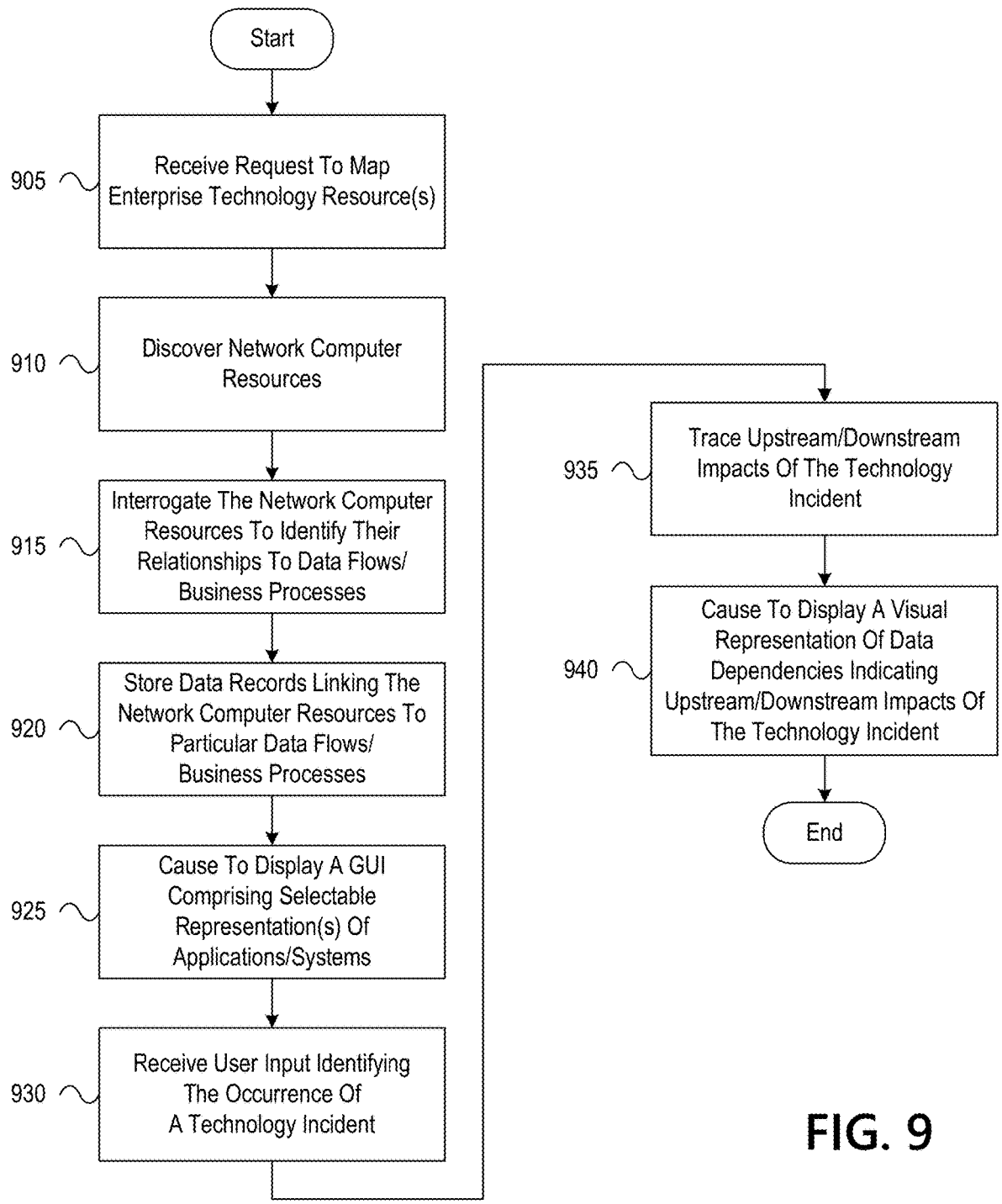
FIG. 9 depicts an illustrative method for application mapping and alerting in accordance with one or more example embodiments.

FIG. 9 depicts an illustrative method for application mapping and alerting in accordance with one or more example embodiments. Referring to FIG. 9, at step 905, a computing platform having at least one processor, a communication interface, and memory may receive, via the communication interface, a request to map one or more enterprise technology resources. Next, at steps 910 through 920, in response to receiving the request to map one or more enterprise technology resources, the computing platform may generate a business capability model. Specifically, generating the business capability model may include, at step 910, the computing platform discovering network computer resources, at step 915, the computing platform interrogating the network computer resources to identify relationships between the network computer resources and upstream or downstream data flows associated with one or more business processes and, at step 920, based on identifying the relationships between the network computer resources and the upstream or downstream data flows associated with the one or more business processes, the computing platform storing data records linking the network computer resources to particular ones of the data flows and associated business processes. At step 925, the computing platform may cause a user computing device to display, on a display device of the user computing device, a graphical user interface that includes one or more selectable graphical representations of one or more applications associated with one or more enterprise technology resources. At step 930, the computing platform may receive, via the communication interface, a user input identifying an occurrence of a technology incident by selecting one of the graphical representations of the one or more applications. At step 935, in response to receiving the user input, the computing platform may trace, using the business capability model, upstream or downstream impacts of the technology incident. In turn, at step 940, the computing platform may cause a visual representation of data dependencies indicating upstream or downstream impacts of the technology incident to be displayed on the display device of the user computing device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
generate a business capability model, wherein generating the business capability model comprises:
discovering network computer resources; and
interrogating the network computer resources to identify relationships between the network computer resources and data flows associated with one or more business processes;
cause a graphical user interface comprising one or more selectable graphical representations of one or more applications associated with one or more enterprise technology resources to be displayed on a display device of a user computing device;
receive, via the communication interface, a first user input identifying an occurrence of a technology incident by selecting one of the graphical representations of the one or more applications, the occurrence of the technology incident including one of: a technology fault or a cyber attack;
in response to receiving the first user input, use the business capability model to automatically trace an impact of the technology incident by generating a visible path across network computer resources affected by the identified technology incident without a human manually tracing the impact of the technology incident;
cause a visual representation of data dependencies indicating the impact of the technology incident to be displayed on the display device of the user computing device;
receive a second user input simulating an addition of one or more applications by interacting with the graphical user interface;
in response to receiving the second user input, use the business capability model to automatically trace an impact of adding the one or more applications by generating a visible path across network computer resources affected by the addition of the one or more applications without a human manually tracing the impact of the addition; and
cause a second visual representation of data dependencies indicating the impact of adding the one or more applications to be displayed on the display device of the user computing device.

2. The computing platform of claim 1, wherein tracing the impact of the technology incident comprises tracing upstream or downstream impacts at N levels, where N is greater than two.

3. The computing platform of claim 1, wherein the memory stores additional computer-readable instructions that, when executed by the at least one processor, cause the computing platform to dynamically update the visual representation of data dependencies as new technology incidents are identified.

4. The computing platform of claim 1, wherein causing the visual representation of data dependencies indicating the impact of the technology incident to be displayed on the display device of the user computing device comprises causing the user computing device to illuminate, on the display device of the user computing device, graphical representations of applications associated with enterprise technology resources in upstream or downstream dependencies.

5. The computing platform of claim 1, wherein the memory stores additional computer-readable instructions that, when executed by the at least one processor, cause the computing platform to validate accuracy of enterprise data based on tracing the impact of the technology incident.

6. The computing platform of claim 1, wherein the memory stores additional computer-readable instructions that, when executed by the at least one processor, cause the computing platform to:
receive a third user input that simulates a removal of one or more applications by interacting with one or more selectable graphical representations of the one or more applications;
in response to receiving the third user input, trace, using the business capability model, an impact of removing the one or more applications; and
cause a third visual representation of data dependencies indicating the impact of removing the one or more applications to be displayed on the display device of the user computing device.

7. The computing platform of claim 1, wherein the memory stores additional computer-readable instructions that, when executed by the at least one processor, cause the computing platform to continuously update the business capability model in accordance with new laws or regulations.

8. The computing platform of claim 1, wherein the memory stores additional computer-readable instructions that, when executed by the at least one processor, cause the computing platform to continuously update the business capability model as network computer resources are removed or new network computer resources are added.

9. A method, comprising:
at a computing platform comprising at least one processor, a communication interface, and memory:
generating, by the at least one processor, a business capability model, wherein generating the business capability model comprises:
discovering network computer resources; and
interrogating the network computer resources to identify relationships between the network computer resources and data flows associated with one or more business processes;
causing, by the at least one processor, a graphical user interface comprising one or more selectable graphical representations of one or more applications associated with one or more enterprise technology resources to be displayed on a display device of a user computing device;
receiving, by the at least one processor, via the communication interface, a first user input identifying an occurrence of a technology incident by selecting one of the graphical representations of the one or more applications, the occurrence of the technology incident including one of: a technology fault or a cyber attack;
in response to receiving the first user input, using the business capability model to automatically trace, by the at least one processor, an impact of the technology incident by generating a visible path across network computer resources affected by the identified technology incident without a human manually tracing the impact of the technology incident;

causing, by the at least one processor, a visual representation of data dependencies indicating the impact of the technology incident to be displayed on the display device of the user computing device;

receiving, by the at least one processor, via the communication interface, a second user input simulating an addition of one or more applications by interacting with the graphical user interface;

in response to receiving the second user input, using the business capability model to automatically trace, by the at least one processor, an impact of adding the one or more applications by generating a visible path across network computer resources affected by the addition of the one or more applications without a human manually tracing the impact of the addition; and causing, by the at least one processor, a second visual representation of data dependencies indicating the impact of adding the one or more applications to be displayed on the display device of the user computing device.

10. The method of claim 9, further comprising dynamically updating, by the at least one processor, the visual representation of data dependencies as new technology incidents are identified.

11. The method of claim 9, wherein generating the business capability model comprises interrogating the network computer resources to identify relationships between the network computer resources and identify upstream or downstream data flows at N levels, where N is greater than two.

12. The method of claim 9, wherein causing the visual representation of data dependencies indicating the impact of the technology incident to be displayed on the display device of the user computing device comprises causing the user computing device to illuminate, on the display device of the user computing device, graphical representations of applications associated with enterprise technology resources in upstream or downstream dependencies.

13. The method of claim 9, further comprising validating, by the at least one processor, accuracy of enterprise data based on tracing the impact of the technology incident.

14. The method of claim 9, further comprising:

receiving, by the at least one processor, via the communication interface, a third user input that simulates a removal of one or more applications by interacting with one or more selectable graphical representations of the one or more applications;

in response to receiving the third user input, tracing, by the at least one processor, using the business capability model, an impact of removing the one or more applications; and causing, by the at least one processor, a third visual representation of data dependencies indicating the impact of removing the one or more applications to be displayed on the display device of the user computing device.

15. The method of claim 9, further comprising continuously updating, by the at least one processor, the business capability model in accordance with new laws or regulations.

16. The method of claim 9, further comprising continuously updating, by the at least one processor the business capability model as network computer resources are removed or new network computer resources are added.

17. One or more non-transitory computer-readable media storing instructions that, when executed by a computing platform comprising at least one processor, a communication interface, and memory, cause the computing platform to:

generate a business capability model, wherein generating the business capability model comprises:
discovering network computer resources; and
interrogating the network computer resources to identify relationships between the network computer resources and data flows associated with one or more business processes;

cause a graphical user interface comprising one or more selectable graphical representations of one or more applications associated with one or more enterprise technology resources to be displayed on a display device of a user computing device;

receive, via the communication interface, a first user input identifying an occurrence of a technology incident by selecting one of the graphical representations of the one or more applications, the occurrence of the technology incident including one of: a technology fault or a cyber attack;

in response to receiving the first user input, use the business capability model to automatically trace an impact of the technology incident by generating a visible path across network computer resources affected by the identified technology incident without a human manually tracing the impact of the technology incident;

cause a visual representation of data dependencies indicating the impact of the technology incident to be displayed on the display device of the user computing device;

receive a second user input simulating an addition of one or more applications by interacting with the graphical user interface;

in response to receiving the second user input, use the business capability model to automatically trace an impact of adding the one or more applications by generating a visible path across network computer resources affected by the addition of the one or more applications without a human manually tracing the impact of the addition; and cause a second visual representation of data dependencies indicating the impact of adding the one or more applications to be displayed on the display device of the user computing device.

18. The one or more non-transitory computer-readable media of claim 17, wherein tracing the impact of the technology incident comprises tracing upstream or downstream impacts at N levels, where N is greater than two.

\* \* \* \* \*